(12) United States Patent
Srivastava

(10) Patent No.: US 7,784,033 B2
(45) Date of Patent: Aug. 24, 2010

(54) JDBC MONITORING AND DIAGNOSTICS ENHANCEMENTS

(75) Inventor: Rahul Srivastava, Randolph, NJ (US)

(73) Assignee: Bea Systems, Inc., Redwood Shores, CA (US)

( * ) Notice: Subject to any disclaimer, the term of this patent is extended or adjusted under 35 U.S.C. 154(b) by 1248 days.

(21) Appl. No.: 11/339,043

(22) Filed: Jan. 25, 2006

(65) Prior Publication Data

US 2007/0094399 A1 Apr. 26, 2007

Related U.S. Application Data

(60) Provisional application No. 60/725,353, filed on Oct. 11, 2005.

(51) Int. Cl.
*G06F 9/44* (2006.01)
*G06F 11/00* (2006.01)

(52) U.S. Cl. .............. 717/127; 717/130; 717/131; 717/158; 714/38; 714/45; 714/47

(58) Field of Classification Search .............. None
See application file for complete search history.

(56) References Cited

U.S. PATENT DOCUMENTS

| | | | |
|---|---|---|---|
| 5,181,204 A | 1/1993 | Kasman | |
| 6,182,109 B1 | 1/2001 | Sharma et al. | |
| 6,275,826 B1 | 8/2001 | Geiner et al. | |
| 6,279,001 B1 | 8/2001 | DeBettencourt et al. | |
| 6,314,430 B1 | 11/2001 | Chang | |
| 7,010,546 B1* | 3/2006 | Kolawa et al. | 707/103 R |
| 7,024,406 B1 | 4/2006 | Kunisetty | |
| 7,127,456 B1* | 10/2006 | Brown et al. | 707/3 |
| 7,127,463 B2 | 10/2006 | Arnold et al. | |
| 7,310,777 B2 | 12/2007 | Cirne | |
| 7,356,523 B2* | 4/2008 | Arnold et al. | 707/2 |
| 7,359,831 B2 | 4/2008 | Shrivastava et al. | |
| 7,502,777 B2 | 3/2009 | Lutterkort | |
| 7,519,952 B2 | 4/2009 | Bordawekar et al. | |
| 7,617,181 B2 | 11/2009 | Arnold et al. | |
| 2003/0126149 A1 | 7/2003 | Jung et al. | |
| 2003/0229888 A1 | 12/2003 | Spotswood et al. | |
| 2004/0054984 A1 | 3/2004 | Chong et al. | |
| 2004/0064552 A1 | 4/2004 | Chong et al. | |
| 2004/0088413 A1 | 5/2004 | Bhogi et al. | |
| 2005/0066312 A1 | 3/2005 | Barsness et al. | |
| 2005/0132335 A1* | 6/2005 | Maron | 717/127 |
| 2005/0216781 A1* | 9/2005 | Doshi et al. | 714/2 |
| 2005/0261879 A1 | 11/2005 | Shrivastava et al. | |
| 2006/0179042 A1 | 8/2006 | Bram et al. | |

(Continued)

OTHER PUBLICATIONS

"Adaptive Server", Technical Library, Apr. 27, 2005, 8 pages. Retrieved from: http//www.archive.org.

(Continued)

*Primary Examiner*—Michael J Yigdall
(74) *Attorney, Agent, or Firm*—Fliesler Meyer LLP

(57) ABSTRACT

Applications can interact with a database using a JDBC subsystem. The JDBC subsystem includes a connection pool with multiple connections, and parses database requests to produce statements to be sent to a database management system (DBMS). A previously parsed statement can be stored in a prepared statement cache. A profiling component can be used to maintain profile information concerning the connection pool and the prepared statement cache.

20 Claims, 5 Drawing Sheets

U.S. PATENT DOCUMENTS

2008/0086285 A1* 4/2008 Gombas et al. ............. 702/187

OTHER PUBLICATIONS

"Java Performance Tuning", Tool Report:Iron Eye SQL, May 2003, 8 pages.

Chen, et al. "DB2 UDB V8 and WebSphere V5 Performace Tuning and Operation Guide", Mar. 2004, 446 pages, IBM Redbooks.

Shrivastava et al., U.S. Appl. No. 60/573,280, filed May 21, 2004, 228 pages.

* cited by examiner

JDBC MONITORING AND DIAGNOSTICS ENHANCEMENTS

CLAIM OR PRIORITY

This application claims priority to U.S. Provisional Application No. 60/725,353 entitled "JDBC Monitoring and Diagnostics Enhancements" filed Oct. 11, 2005.

BACKGROUND OF INVENTION

The present invention relates to JDBC subsystems, especially diagnostic, monitoring and debugging components for JDBC subsystems.

JAVA Database Connectivity (JDBC) is an application program interface (API) that provides connectivity to a wide range of databases as well as access to other types of tabular data sources, such as spreadsheets or flat files. With a JDBC technology enabled driver, users can connect to all types of corporate data in a heterogeneous environment. To use the JDBC API with particular database management system, a JDBC technology based driver is used to mediate between JDBC technology and the database.

The JDBC subsystem can be associated with an application server such as the WebLogic™ Server available from BEA Systems, Inc. of San Jose, Calif. FIG. 1 illustrates an example in which the application server 102 includes a JDBC subsystem 104. In this case, the JDBC subsystem includes a multipool 106 consisting of connection pools 108 and 110. Connection pool 108 has a number of connections, such as connections 108a, 108b and 108c into the database 112. These connections can be made available by the JDBC subsystem 104 to clients, such as the external clients 114 and internal clients 116. In one embodiment, the access can be transactional in which case TxData Source 120 is used or an non-transaction in which case Data source 122 is used.

DETAILED DESCRIPTION

Figure 1:
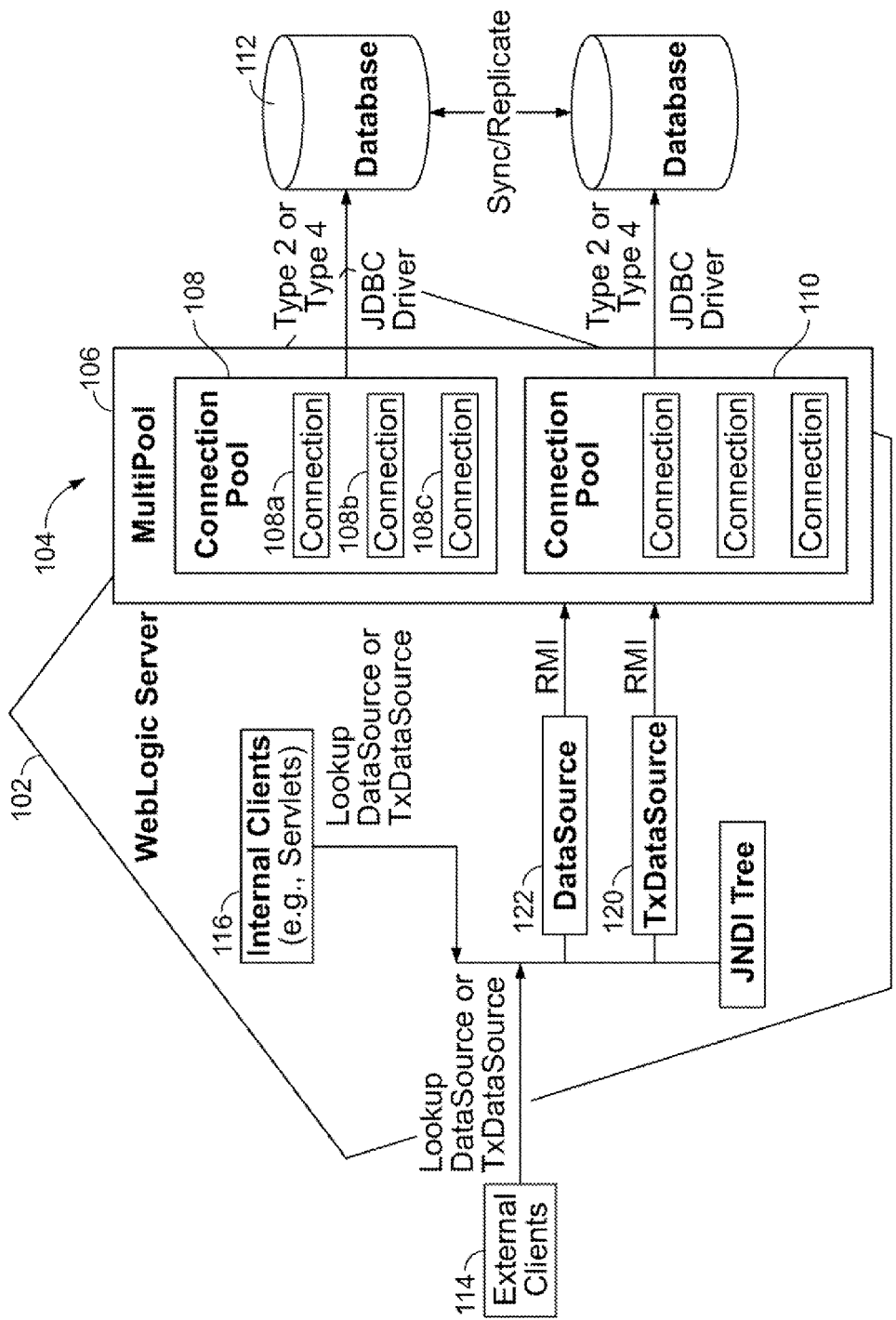
FIG. 1 illustrates an example where an application server includes a JDBC subsystem.
Figure 2:
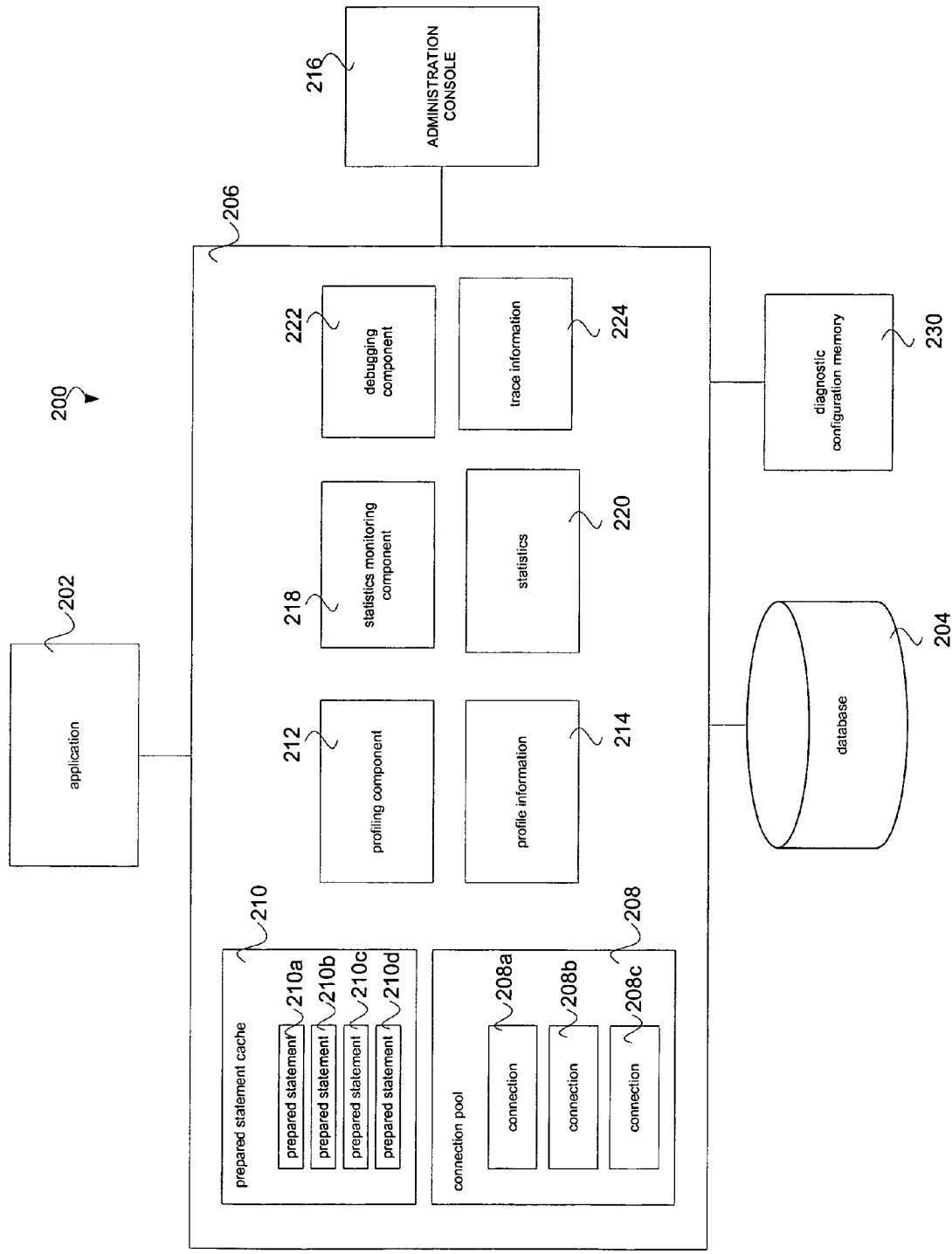
FIG. 2 illustrates an exemplary system where applications can interact with a database using a JDBC subsystem.

FIG. 2 illustrates a system 200 in which applications 202 can interact with the database 204 using JDBC subsystem 206. In this example, the JDBC subsystem 206 includes a connection pool 208 with multiple connections, such as connections 208a, 208b and 208c.

Multiple connection pools and multipools can be used. In one embodiment, the JDBC subsystem 206 parses a database requests to produce statements to be sent to the database management system (DBMS). In order to speed up these requests, a previously parsed statement can be stored in a prepared statement cache 210. The prepared statement cache 210 can include prepared statements, such as prepared statements 210a, 210b, 210c and 210d. The JDBC subsystem 206 can check the prepared statement cache to see whether a request is the same as a previously received request. This is quite likely when the client, such as application 202, sends the same request multiple times.

In one embodiment of the present invention, the JDBC subsystem contains, or is associated with, a profiling component 212. In one embodiment, the profiling component 212 is configured to maintain profile information 214 concerning components of JDBC subsystem 206. The profile information 214 can be derived from the statistics 220.

In one embodiment, the profile component 212 maintains profile information 214 concerning the connection pool 208. The profile information 214 can include a connection usage profile indicating who currently has a pool connection. Such information is useful for administrators of the application system. In one embodiment, administrators can access the JDBC subsystem 206 using an administration console 216. In one embodiment, the connection usage profile indicates when a connection was reserved.

In one embodiment, the profiling component contains profile information including a wait profile indicating who is waiting for a connection. The wait profile can indicate how long the person has been waiting for this connection. The wait profile is useful for checking the operation of the system.

The profiling information 214 can also include a wait failure profile indicating who waited for a connection. The wait failure program can also indicate how long a client waits for a connection. Such information is useful when analyzing the operation of the JDBC subsystem 206.

The profiling information 214 can include connection leak profile information indicating who reserved the connection but did not use it. In one embodiment, applications or internal clients that hold onto a connection longer than a predetermined time, such as 30 seconds, can be considered to have held onto the connection in error. Maintaining the connection leak profile allows the administrator to see which applications or internal clients are failing in this manner.

The profiling component can maintain profile information concerning the prepared statement cache 210. The profile information can include a cached statement profile indicating who has added prepared statements to the prepared statement cache 210. The profile information can include a statements executed profile indicating who executed cache statements and how long the execution of the cached statements took. Such information is useful for an administrator to adjust the prepared statement cache 210. For example, a prepared statement cache 210 may be adjustable in terms of the number of prepared statements stored. Analysis of the profile information allows the administrator to select the correct size of the prepared statement cache 210.

The JDBC subsystem 206 can include or be associated with a statistics monitoring component 218. The statistics monitoring component 218 can be configured to maintain statistics 220. Statistics 220 can included statistics concerning the connection pool 208 and prepared a statement cache 210. In one embodiment, the statistics 220 indicate the cumulative number of requests to reserve a connection from the connection pool 208. In one embodiment, the statistics include the cumulative number of times a reserve request fails. The statistics can include an average time a connection is in use by a client. In one embodiment, the statistics include the average time the client waited for a connection. In one embodiment, the statistics include the percentage of time connections in the connection pool were used. In one embodiment, the statistics include the percentage of time all of the connections in the pool were in use. In one embodiment, the statistics include the cumulative number of requests to reserve a connection of a pool that had to wait. In one embodiment, the statistics include a cumulative number of times a requests to reserve that waited that failed to get a connection.

The system statistics can concern the prepared statement cache 210. The statistics can include the cumulative number of times that the cache 210 is accessed. The statistics can include the cumulative number of statements are added to the cache. The statistics can include the cumulative number of statement discarded from the cache. The system can also include the cumulative number of statements in the cache. The statistics can be used by an administrator to monitor the operation of the JDBC subsystem 206.

In one embodiment, the JDBC subsystem 206 contains, or is associated with, a debugging component 220. The debugging component 222 can debug accesses to the connection pool 208 and/or the prepared statement cache 210. The debugging component 222 can store trace information 224 concerning the debugging. The debugging can be selectable on and off.

In one embodiment, the debugging component is configured to trace methods involved in a JDBC driver. The debugging component can be selectable to enable or disable the traces. The debugging component can trace the arguments of methods invoked in the JDBC driver. The debugging component can trace the return values of the methods invoked in the JDBC driver, errors of message invoked in the JDBC driver and exceptions of the messages invoked in the JDBC driver. The debugging component can be configured to trace operations invoked in the connection pool.

The debugging component can trace connection reserve operations, connection release operations, application requests to get connections, and application requests to close connections.

The debugging component can be configured to trace operations involved in a prepared statement cache. The debugging component can trace cache hits, cache misses, cache statement additions, and cache statement releases.

In one embodiment, the debugging statistics and profiling data can be switched on and off using configuration information in the diagnostics configuration memory 230. The diagnostics configuration memory 230 can be a MBean which stores the diagnostic configuration information for JDBC subsystem.

Figure 3:
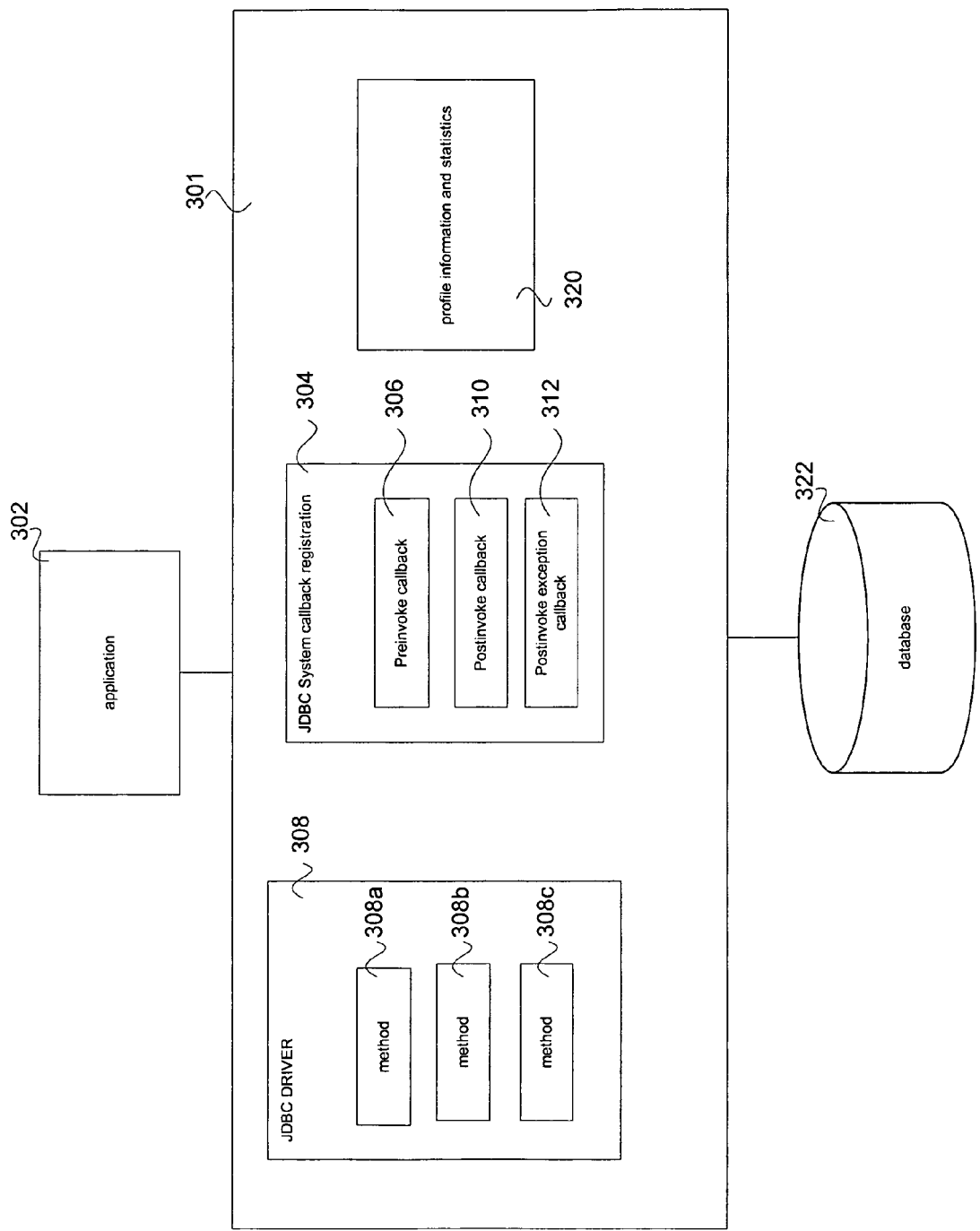
FIG. 3 illustrates an example of a JDBC callback.

FIG. 3 illustrates a JDBC subsystem callback. In this case, the application 302 can register a callback with a JDBC system callback registration 304. The JDBC subsystem 301 can check for a callback to execute. In one embodiment, multiple different callback APIs can be registered by application. In one embodiment, these callbacks include a PreInvoke callback 306 which is invoked before operating any of the methods 308*a*, 308*b* and 308*c* of the JDBC driver 308. A PostInvoke callback 310 can execute after a method executes and the PostInvokeException callback 312 can be executed at the time of an exception in the method of the JDBC driver. The application 302 can use each of these callbacks to obtain information, especially the profile statistics and debugging information stored in the profile information and statistics 320.

One embodiment of the present invention, is a method for operating a JDBC subsystem 301 comprising accessing a JDBC driver 308 at the request of an application 302. During the accessing step, it is checked whether the application has a diagnostic callback. If the application has a diagnostic callback, the diagnostic callback is started.

The diagnostic callback can then execute and then do operations such as obtaining profile statistic information 320.

In one embodiment, the callbacks can be provided by the application to do the diagnostic functions desired by the callback. In one embodiment, the diagnostic callback is called upon an exception. The diagnostic callback can be called before executing a method of the JDBC driver, after executing a method in the JDBC driver and upon an exception in the method.

The diagnostic callback can profile the JDBC driver. The callback can monitor methods of the JDBC driver being executed. The callback can monitor exceptions thrown by the JDBC driver.

The diagnostic callback can be interface that it can be implemented by the application 302. The diagnostic callback can be registered with the JDBC subsystem using the JDBC system callback registration 304. The registration can indicate whether a callback is to be run as well as indicating the point to the code that the callback code. The JDBC subsystem can check whether the diagnostic callback is registered during the accessing step.

One embodiment of the present invention comprises adding JDBC configuration information into a diagnostic image. Upon an event, compiling diagnostic information from the JDBC subsystem can be compiled along with other information about the state of the software about the state of server software into a data stream; and compressing the data stream.

Figure 4:
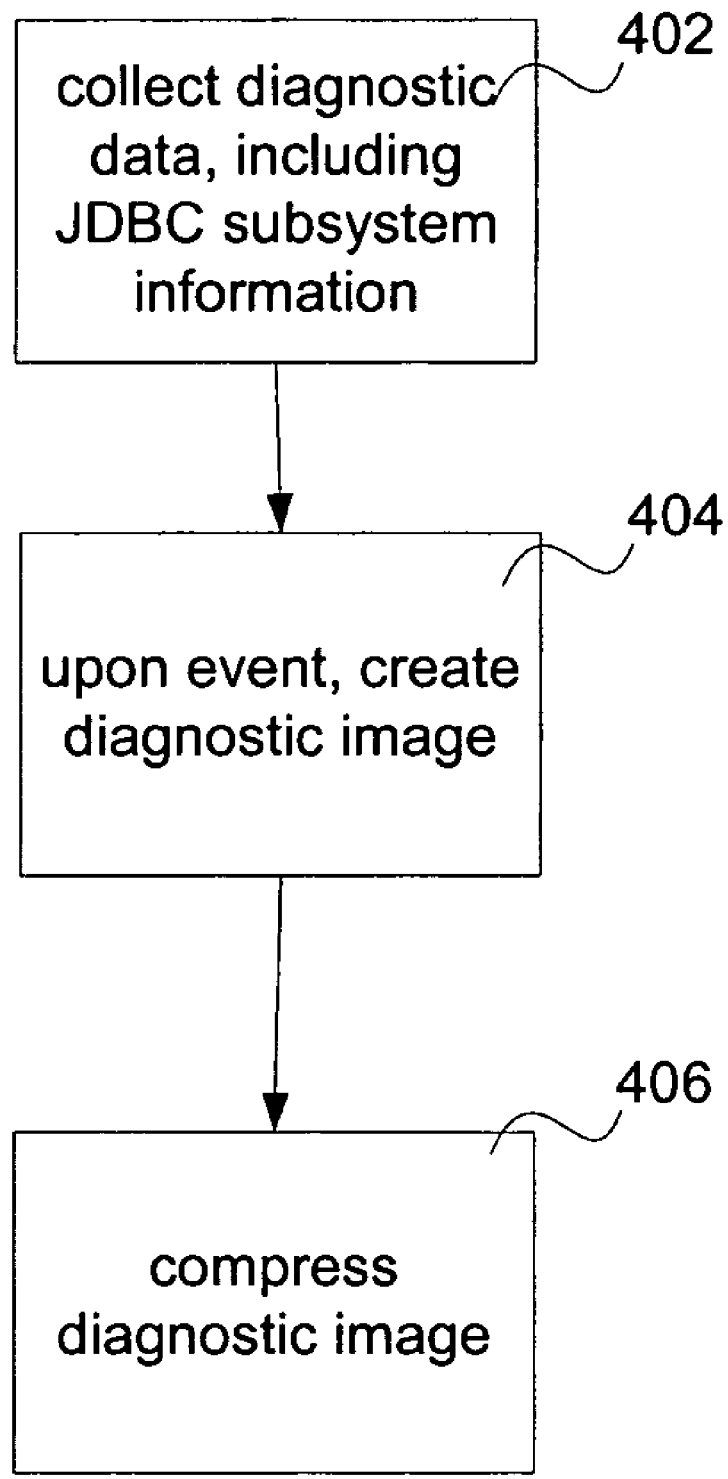
FIG. 4 is a flow chart of one embodiment of the present invention.

FIG. 4 illustrates an embodiment of the present invention. In step 402, the diagnostic data is collected. Typically, the diagnostic data is kept in volatile memory. The diagnostic data can be collected at different collection points through the server software and applications. The JDBC diagnostics information can include a dump of the connection pool data structure. This can include all the JDBC connections that are being pooled and related data structures. The JDBC diagnostics information can then be put into the diagnostic image. In Step 404, upon an event, a diagnostic image is created. The event can be recognition by the server software of a prefailure state or can be an event such as the user selecting the collection of the diagnostic image. The collected diagnostic information can be a diagnostic image including information concerning multiple software components of the server software. The diagnostic image file can be very large, for example, over 1 megabyte. In step 406, the diagnostic image can be compressed. In one embodiment, the diagnostic information is compressed into a zip file. The compressed zip file can be sent across the internet from a server software site to a central location, such as the office of the server software vendor. The compressed diagnostic image can be sent in an email.

In one embodiment, a diagnostic image is not created for each failure. The creation of multiple diagnostic images can be expensive because of large size of the diagnostic images. A timer can be used to inhibit the collection of multiple diagnostic images.

One embodiment of the present invention includes software including code to, upon an event, compile diagnostic information about the state of server software into a data stream; and code to compress the data stream.

Figure 5:
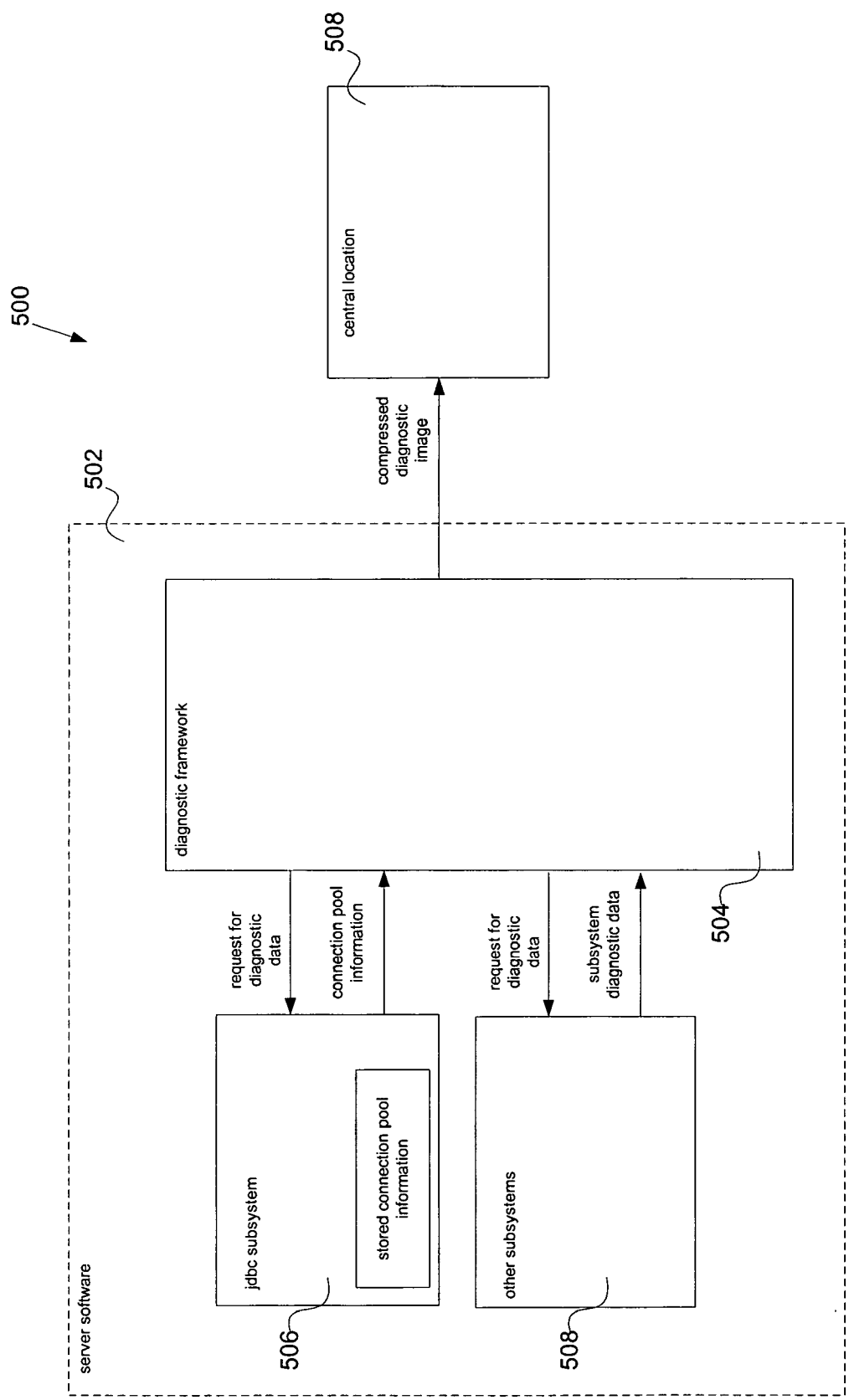
FIG. 5 illustrates an exemplary server system.

FIG. 5 shows an exemplary system 500. Server software 502 can include a diagnostic framework 504 to do diagnostic functions. Upon an event, the diagnostic framework 504 can send requests for diagnostic data to the subsystems of the server software 502, such as the JDBC subsystem 506 and other subsystems 508. In response to the requests, the subsystems can send diagnostic data to diagnostic framework 504. For example, the JDBC subsystem 506 can send connection pool information to the diagnostic framework 504. The diagnostic framework 504 can compile the diagnostic information and send it to a central location 508 for analysis. The compiled information can be compressed to reduce the amount of data that needs to be sent.

One embodiment of a diagnostic image system is described in the application entitled "Diagnostic Image", application Ser. No. 11/133,566 filed May 20, 2005 incorporated herein by reference.

One non-limiting example of a JDBC Diagnostics System is described below:

STATISTICS—User can be able to view snapshots of values of attributes of configured JDBC objects that are either current or recently recorded.

Following new statistics can be made available for connection pools:
- Cumulative number of requests to reserve a connection from pool
- Cumulative number of times reserve requests failed
- Average time a connection is in use by client
- Average time a client waited for a connection
- Percentage of connections in pool currently in use
- Percentage of time all connections in pool were in use
- High watermark of current capacity of pool
- Cumulative number of requests to reserve a connection from pool that had to wait
- Cumulative number of times reserve requests that waited, failed to get a connection The Following new statistics can be made available for the prepared statement cache:
- Cumulative number of times cache accessed
- Cumulative number of statements added to the cache
- Cumulative number of statements discarded from the cache
- Current number of statements in cache PROFILES—User can be able to view data aggregated and/or derived from values of attributes of configured JDBC objects. This can help the user in understanding the usage patterns of the JDBC objects by the application.

The following information about connection pools can be profiled:
- Connection Usage (who currently has a pool connection, when did they reserve it)
- Wait (who waited for a connection, how long)
- Wait Failure (who waited for a connection, how long)
- Connection Leaks (who had reserved it)

The following information about the prepared statement cache can be profiled:
- Cached statements (who added them)
- Statements executed (who executed them, how long did execution take)

EXEMPLARY PROFILE INFORMATION INTERFACE—The collected profile information can be stored in an archive, such as the WLDF Archive in records that are instances of the type weblogic.jdbc.extensions.ProfileDataRecord.

Application clients can query the WLDF Archive for data records of the following types to retrieve JDBC profile data:

ProfileDataRecord.TYPE_CONN_USAGE—snapshot of thread using a JDBC Connection

ProfileDataRecord.TYPE_CONN_WAIT—snapshot of thread waiting to reserve a Connection ProfileDataRecord.TYPE_CONN_LEAK—snapshot of thread that had previously reserved a Connection and has now been found to leak it.

ProfileDataRecord.TYPE_CONN_RESV_FAIL—snapshot of thread that failed to reserve a Connection ProfileDataRecord.TYPE_STMT_CACHE_ENTRY—cache entry and thread that caused the statement to be added (to the cache).

ProfileDataRecord.TYPE_STMT_USAGE—statements being executed and threads executing them.

ProfileDataRecord.TYPE_CONN_LAST_USAGE—thread that last used the connection.

ProfileDataRecord.TYPE_CONN_MT_USAGE—connection used by thread different from the one that reserved it.

APPLICATION CALLBACKS—The Application can register callbacks that can get invoked before and after invocations of methods in the JDBC driver.

In one embodiment, the application can provide an implementation of the interface "weblogic.jdbc.extensions.DriverInterceptor" and register it with the JDBC subsystem using the element "driver-interceptor" of the descriptor.

JDBC subsystem can invoke methods "preInvokeCallback( )", "postInvokeExceptionCallback( )" and "postInvokeCallback( )" of the registered callback before and after invoking any method inside the JDBC driver.

Applications can implement this interface to profile the usage of the JDBC driver and monitor things like:
- Methods being executed
- Any exceptions thrown
- Time spent inside the driver executing methods
- Exemplary Application Callbacks Interface

```
public interface DriverInterceptor {
    public Object preInvokeCallback(Object vendorObj, String methodName, Object[ ] params)throws SQLException;
    public void postInvokeCallback(Object vendorObj, String methodName, Object[ ] params, Object ret) throws SQLException;
    public void postInvokeExceptionCallback(Object vendorObj, String methodName, Object[ ] params, Throwable error) throws SQLException;
}
```

DEBUGGING—Application can be able to analyze the usage of JDBC objects such as connection pools, prepared statement caches or JDBC drivers. In one embodiment, this can be done by enabling attributes of the ServerDebugMBean. In one embodiment, this can be done by application server developers personnel, rather than the customer themselves.

In one embodiment, the efficacy of existing JDBC-related attributes "JDBCSQL" and "JDBCConn" in ServerDebugMBean are improved:
- JDBCSQL—print out trace all methods invoked in the JDBC driver, their arguments and return values, errors and exceptions.
- JDBCConn—trace all connection reserve and release operations in connection pools as well as all application requests to get or close connections Following new attributes can be added to ServerDebugMBean:
- JDBCStatementCache—trace all cache hits and misses, additions and deletions
- JDBCDriverLogging—enable JDBC driver level logging. This will deprecate the existing mechanism of enabling JDBC driver level logging using attributes in ServerMBean.
- JDBCRMI—Debugging at the RMI level—intended primarily for CCE/Engineering use.
- JDBCInternal—Internal debugging information—intended for CCE/Engineering use.

Functionality provided by debugging systems can be used to output all information generated by enabling the above-mentioned attributes.

As facilitated by the debugging system, a new Debug Scope called "weblogic.jdbc" can be created and all above-mentioned new and existing ServerDebugMBean attributes cab be tagged as being part of this Debug Scope. Existing ServerDebugMBean attribute "JTAJDBC" cab also be tagged as being part of weblogic.jdbc scope.

Exemplary Debugging Interface

```
public interface ServerDebugMBean extends KernelDebugMBean {
    // enable Prepared Statement Cache profiling
    public boolean getJDBCStatementCache( );
    public void setJDBCStatementCache(boolean newVal);
    // enable JDBC RMI debugging
    public boolean getJDBCRMI( );
    public void setJDBCRMI(boolean newVal);
    // enable JDBC Internal debugging
    public boolean getJDBCInternal( );
    public void setJDBCInternal(boolean newVal);
    // enable JDBC Driver level logging
    public boolean getJDBCDriverLogging( );
    public void setJDBCDriverLogging(boolean newVal);
}
```

DIAGNOSTIC IMAGE—In one embodiment, the application can be able to obtain a Diagnostic Image of the JDBC subsystem.

REQUEST DYEING—In one embodiment, the user can trace the flow of an individual (typically "dyed") application request through the JDBC subsystem.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system comprising:
a computer including a processor, memory, and application server operating thereon, wherein the application server enables access between one or more client applications and a database;
a JDBC subsystem associated with the application server, wherein the JDBC subsystem includes
a connection pool which includes a plurality of connections for use by the client applications in communicating requests to the database,
a prepared statement cache which includes a plurality of previously parsed requests that can be reused by the client applications and communicated to the database,
a profiling component which maintains profile information concerning the connection pool and the prepared statement cache, wherein the profile information includes a connection usage profile indicating which particular client applications are currently using a connection or a prepared statement with the database, and
a statistics monitoring component which maintains cumulative or averaged information concerning usage of the connection pool and the prepared statement cache over all of the client applications; and
wherein the system enables a diagnostic image to be created which includes the profile information and the cumulative or averaged information for applications that are being monitored by the JDBC subsystem.

2. The system of claim 1, wherein the connection usage profile indicates when a pool connection was reserved by a client.

3. The system of claim 1, wherein the profile information includes a wait profile indicating which client is currently waiting for a connection.

4. The system of claim 1, wherein the profile information includes a wait failure profile indicating which client waited for a connection.

5. The system of claim 1, wherein the profile information includes a connection leak profile indicating which client reserved a connection and did not use the connection.

6. The system of claim 1, wherein the profile information includes a cached statements profile indicating which client added the cached statements.

7. The system of claim 1, wherein the profile information includes a statement executed profile indicating which client executed the cached statements.

8. The system of claim 1, wherein the profile information includes a statement executed profile indicating how long the execution of the cached statements took.

9. A method of providing a diagnostic image for a JDBC subsystem, comprising the steps of:
providing a computer including a processor, memory, and application server operating thereon, wherein the application server enables access between one or more client applications and a database;
providing a JDBC subsystem associated with the application server, wherein the JDBC subsystem includes
a connection pool which includes a plurality of connections for use by the client applications in communicating requests to the database,
a prepared statement cache which includes a plurality of previously parsed requests that can be reused by the client applications and communicated to the database,
a profiling component which maintains profile information concerning the connection pool and the prepared statement cache, wherein the profile information includes a connection usage profile indicating which particular client applications are currently using a connection or a prepared statement with the database, and
a statistics monitoring component which maintains cumulative or averaged information concerning usage of the connection pool and the prepared statement cache over all of the client applications; and
creating a diagnostic image which includes the profile information and the cumulative or averaged information for applications being monitored by the JDBC subsystem.

10. The method of claim 9, wherein the connection usage profile indicates when a pool connection was reserved by a client.

11. The method of claim 9, wherein the profile information includes a wait profile indicating which client is currently waiting for a connection.

12. The method of claim 9, wherein the profile information includes a wait failure profile indicating which client waited for a connection.

13. The method of claim 9, wherein the profile information includes a connection leak profile indicating which client reserved a connection and did not use the connection.

14. The method of claim 9, wherein the profile information includes a cached statements profile indicating which client added the cached statements.

15. The method of claim 9, wherein the profile information includes a statement executed profile indicating which client executed the cached statements.

16. The method of claim 9, wherein the profile information includes a statement executed profile indicating how long the execution of the cached statements took.

17. A computer readable medium, including instructions stored thereon which when read and executed by a computer cause the computer to perform the steps comprising:

providing an application server that enables access between one or more client applications and a database;

providing a JDBC subsystem associated with the application server, wherein the JDBC subsystem includes a connection pool which includes a plurality of connections for use by the client applications in communicating requests to the database, a prepared statement cache which includes a plurality of previously parsed requests that can be reused by the client applications and communicated to the database, a profiling component which maintains profile information concerning the connection pool and the prepared statement cache, wherein the profile information includes a connection usage profile indicating which particular client applications are currently using a connection or a prepared statement with the database, and a statistics monitoring component which maintains cumulative or averaged information concerning usage of the connection pool and the prepared statement cache over all of the client applications; and creating a diagnostic image which includes the profile information and the cumulative or averaged information for applications being monitored by the JDBC subsystem.

18. The computer readable medium of claim 17, wherein the connection usage profile indicates when a pool connection was reserved by a client.

19. The computer readable medium of claim 17, wherein the profile information includes a wait profile indicating which client is currently waiting for a connection or which client waited for a connection.

20. The computer readable medium of claim 17, wherein the profile information includes a cached statements profile indicating which client added the cached statements or which client executed the cached statements.

* * * * *